United States Patent [19]
Grove

[11] 4,177,695
[45] Dec. 11, 1979

[54] ROTARY SPEED CHANGER

[76] Inventor: Leslie H. Grove, 707 E. Hoyt Ave., St. Paul, Minn. 55106

[21] Appl. No.: 763,919

[22] Filed: Jan. 31, 1977

Related U.S. Application Data

[63] Continuation-in-part of Ser. No. 583,595, Jun. 4, 1975, abandoned.

[51] Int. Cl.² ............................................. F16H 1/28
[52] U.S. Cl. .................................................. 74/80.4
[58] Field of Search ................ 74/804, 805; 418/61 B, 418/150

[56] References Cited
U.S. PATENT DOCUMENTS 2,170,951  8/1939  Perry ......................................... 74/804
2,209,201  7/1940  Hill ............................................. 74/805

*Primary Examiner*—C. J. Husar
*Assistant Examiner*—Frank H. McKenzie, Jr.
*Attorney, Agent, or Firm*—Robert E. Granrud

[57] ABSTRACT

Rotary speed changer including a 2-element internal gear set. The eccentric of a crankshaft is journalled in the inner element on its axis. Fixed to a driveshaft is a plate which has cycloid pins mating with cycloid holes in the inner element so that the driveshaft rotates at a fraction of the speed of rotation of the crankshaft. Instead of being attached to the driveshaft, the plate may be fixed to the housing so that the outer element of the gear set rotates at a fraction of the speed of the crankshaft.

11 Claims, 7 Drawing Figures

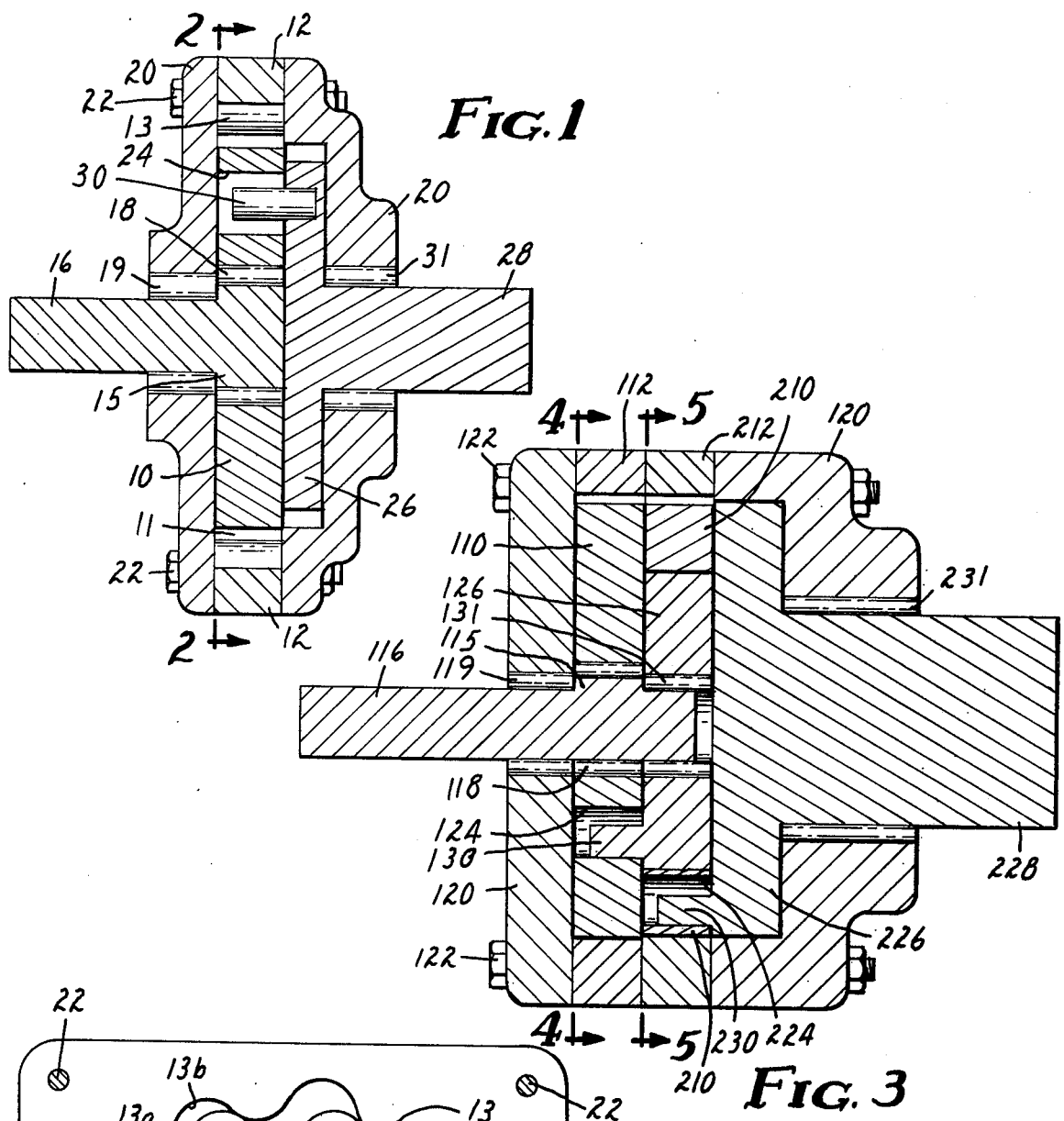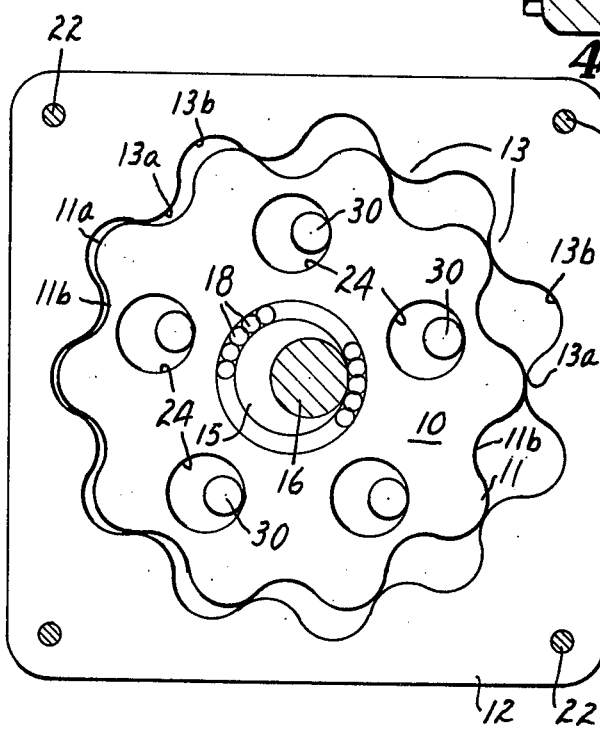

ROTARY SPEED CHANGER

CROSS-REFERENCE TO RELATED APPLICATION

This application is a continuation-in-part of applicant's copending application Ser. No. 583,595, filed June 4, 1975, now abandoned.

BACKGROUND OF THE INVENTION

The most commonly used rotary speed changers, i.e., worm and spur gear trains, are inefficient and involve substantial friction and wear, especially at high input or output speeds such as 10,000 rpm. For greater efficiency and/or longer life, more sophisticated and expensive devices have been employed such as the internal gear sets shown in U.S. Pat. Nos. 3,367,239 (Takagi) and Re. 26,383 (Huber).

Highly efficient speed changing is provided by the internal gear set illustrated in FIGS. 1 and 2 of my U.S. Pat. No. 3,979,167. At an input speed of 9000 rpm, the inner gear member pumps fluids at 1000 rpm, a speed at which shaft seals will last indefinitely. Although this internal gear set is less expensive than those of the above-cited U.S. patents, there has been a continuing need for an efficient rotary speed changer of even lower cost.

A speed changer which bears a superficial similarity to that of the present invention is shown in U.S. Pat. No. 2,170,951 (Perry). That speed changer is exceedingly expensive, necessarily having large numbers of involute teeth. Because all teeth are not in continuous mesh, there is considerable meshing noise.

It may occur to one skilled in the art to attempt to replace the gears of Perry with the gears shown in FIG. 1A U.S. Pat. No. 2,209,201 (Hill) in spite of the fact that Hill's teeth are rather sharp and hence can break under the very high sideloading pressures that can be encountered at high speed-reduction ratios. In an internal gear set made as shown in Hill's FIG. 1A, the ratio of the root diameter of the inner gear element to the eccentricity is 6.57 to 1. That ratio for the inner gear element of Hill's FIG. IA appears to approach 7 to 1. Such a small ratio does not permit the inner gear to be formed with cycloid holes without undue weakening of either or both the inner gear and the cycloid pins.

THE PRESENT INVENTION

The rotary speed changer of the present invention is highly efficient, like those of the aforementioned patents, but permits significant cost reductions, both in design and in manufacture. Although it includes an internal gear set which may function as a fluid motor or pump, it may not be effective for such use, especially if designed for optimum economy of construction. Hence, while a typical rotary speed changer of the invention meets an important need, the more economical embodiments lack the dual purpose of the internal gear set of my U.S. Pat. No. 3,979,167.

The novel speed changer includes a housing containing a 2-element internal gear set which, like many such gear sets of the prior art, has n external teeth on the inner element and n+1 internal teeth on the outer element, n being an integer of at least 3. While the teeth may have the simplified tooth form of my U.S. Pat. No. 3,709,055, the novel speed changer may employ internal gear sets which are easier to design and less expensive to manufacture, there being no need to maintain fluid-tight seals between the elements of the gear set as required in fluid motors and pumps.

The ratio of the root diameter of the inner gear element to the eccentricity is large, at least 9 to 1, so that its teeth are superior to those of the above-cited Hill patent in their ability to withstand the high side-loading torque pressures encountered at high speed reduction ratios. Preferably that ratio is at least 12 to 1 since increases in the ratio permit greater economy in tooth design and manufacture as well as even greater tooth strength.

In the novel speed changer, a crankshaft journalled in the housing coaxially with the outer element of the internal gear set has an eccentric journalled in a cylindrical opening centered on the axis (geometric center) of the inner element which is formed with m cylindrical cycloid holes or pins centered on and equally spaced along a first circle centered on its axis, m being an integer, preferably at least three. Mounted adjacent said inner element is a plate having a cylindrical cycloid pin or hole mating with each cycloid hole or pin of the inner element. The diameter of each cycloid hole should exceed the diameter of the mating cycloid pin plus twice the eccentricity.

The mating cycloid pins and holes may serve to transmit torque between the plate and the inner element of the gear set with the outer element fixed to (or integral with) the housing, in which case m should be at least three in order to provide reasonably smooth driving action. On the other hand, in some embodiments of the invention, the plate is fixed to (or integral with) the housing and serves only to prevent the inner element from rotating while allowing it to translate in circular path, in which case a single cycloid hole and mating pin are sufficient. In any case, there could be less pins than cycloid holes, but to no advantage.

Because the ratio of the root diameter of the inner gear element is at least 9 to 1, the cycloid holes may be formed in the inner gear element without unduly weakening its teeth. If instead the inner gear element is fitted with pins, it is economical to press-fit the pins into holes which might weaken the inner gear element unduly at ratios substantially below 9 to 1.

In a specific embodiment of the invention, the plate may be fixed to (or integral with) a driveshaft which is journalled in the housing coaxially with the crankshaft. If the crankshaft is driven while the outer element of the internal gear set is held stationary, n revolutions of the crankshaft produce one revolution of the driveshaft, n being the number of external teeth on the inner gear element. If the driveshaft is driven while the outer element is held stationary, one rotation of the driveshaft produces n revolutions of the crankshaft. Conveniently, but not necessarily, the crankshaft and driveshaft extend to opposite sides of the internal gear set.

If the aforementioned plate is fixed to (or integral with) the housing, there are n+1 rotations of the crankshaft for each rotation of the outer gear element which may be fixed to (or integral with) a driveshaft.

To provide a multi-stage speed changer, either the outer element of the internal gear set or the plate may be fixed to the housing while the other has a cylindrical periphery which may have the same or different eccentricity with respect to the crankshaft as does the aforementioned eccentric. Such cylindrical periphery may be journalled in an opening on the axis (geometric center) of the inner element of a second internal gear set which has the same general construction as the first internal gear set except for size, shape and number of teeth, all of which may be chosen independently of the first. Mating with y cycloid holes or pins of the inner element of the second internal gear set are cycloid pins or holes of a second plate, y being an integer, preferably at least three. As in the first stage, either the second plate or the outer element of the second gear set is fixed to the housing while the other is free to rotate and may be fixed to a driveshaft journalled to the housing coaxial to the crankshaft, or it may have an offset cylindrical periphery to serve as the eccentric for a third axially-aligned internal gear set.

When the outer element of each gear set of a 2-stage speed reducer is held stationary, each rotation of the crankshaft produces at a driveshaft fixed to the inner element of the second gear set $1/_{n\,x}$ rotation, where n and x are the number of teeth of the inner gears of the first and second gear sets, respectively, x being an integer of at least three. Since it is practical for each of n and x to be as large as 50 or even greater, very large speed increases or reductions can be achieved with 2- and 3-stage rotary speed changers of the invention.

Because the forces to which the teeth are subjected are primarily in compression, with very little shear component, the gear elements may be formed of any materials which are reasonably wear-resistant. For example, the gear elements can be cast metals or molded plastics, preferably fiber-reinforced, and can even be somewhat flexible. Sintered metals are especially useful. Generally, it is preferred that the mating gear elements be formed of two different materials which are known to have good resistance to wear when moved in contact with each other as is well known in the art.

THE DRAWING

The simplicity and construction of speed changers embodying the invention will become more apparent from the drawing in which:

FIG. 1 is a central section of a single-stage speed changer of the invention;

FIG. 2 is a section along line 2—2 of FIG. 1;

FIG. 3 is a central section of a longitudinally-stacked two-stage speed changer of the invention;

Figure 4:
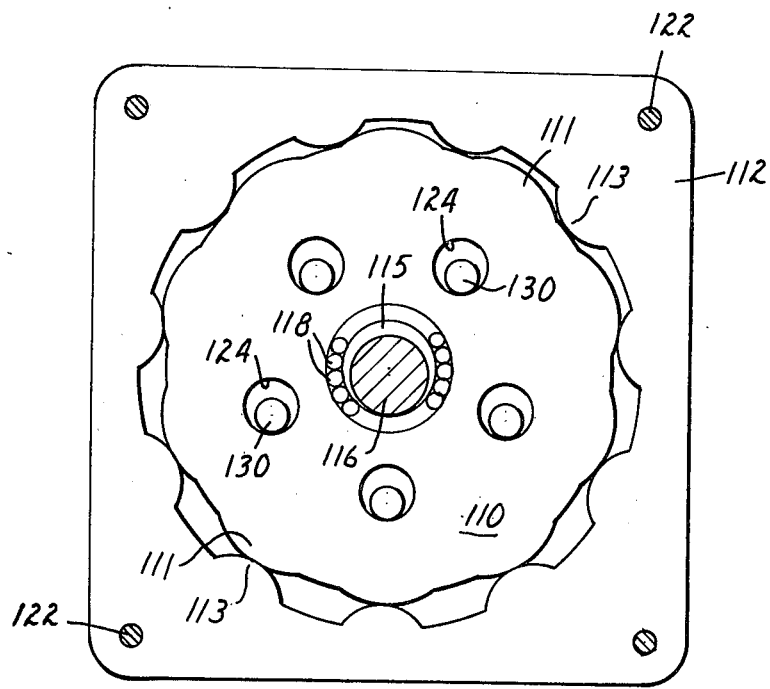
FIG. 4 is a section along line 4—4 of FIG. 3.

The internal gear set employed in FIGS. 1 and 2 consists of an inner gear element 10 having ten external teeth 11 and an outer gear element 12 having eleven internal teeth 13. Both sets of teeth 11 and 13 have tooth profiles as disclosed in my U.S. Pat. No. 3,709,055. The tip arcs 11a and 13a of each tooth profile have slightly smaller radii than do the mating dedendum arcs 13b and 11b, respectively, to provide clearance.

The inner gear element 10 is mounted on an eccentric 15 of a crankshaft 16 by a needle bearing 18 such that the axis of the eccentric coincides with the axis (geometric center) of the inner gear member. The crankshaft 16 is journalled in a needle bearing 19 in a housing 20. The outer gear element 12 is fixed to the housing by four bolts 22.

The inner gear element 10 is formed with five identical cylindrical cycloid holes 24 which are centered on and equally spaced along a circle centered on the axis of the inner gear member. Affixed to a plate 26, which is integral with a driveshaft 28, are five identical, equally-spaced cylindrical cycloid pins 30 centered on a circle having its center at the axis of the driveshaft 28 and a radius equal to that of the aforementioned circle on which the cycloid holes 24 are centered. The driveshaft 28 is journalled in a needle bearing 31 in the housing 20. The diameter of each cycloid hole 24 slightly exceeds the diameter of each cycloid pin 30 plus twice the eccentricity of the crankshaft-eccentric 15. Because the ratio of the root diameter of the inner gear element 10 to the eccentricity is 12 to 1, it has good strength in spite of the cycloid holes 24.

When power is applied to the crankshaft 16, each revolution of the crankshaft produces 1/10 revolution of the driveshaft 28. If instead power were applied to the driveshaft, each revolution would produce 10 revolutions of the crankshaft 16.

Figure 5:
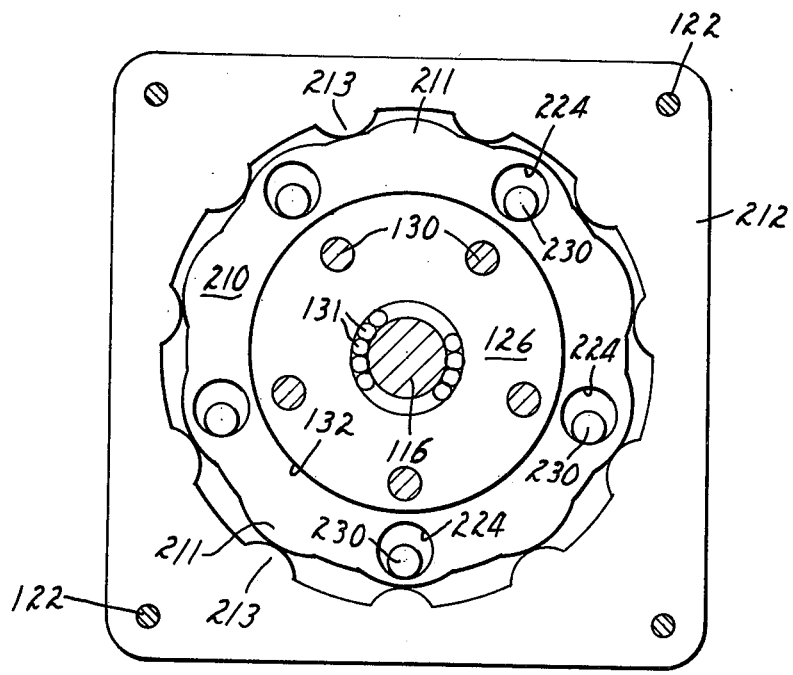
FIG. 5 is a section along line 5—5 of FIG. 3.

The construction of each stage of the longitudinally-stacked 2-stage speed changer of FIGS. 3–5 is essentially the same as the single stage shown in FIGS. 1 and 2. The inner gear element 110 of the first stage is mounted on an eccentric 115 of a crankshaft 116 by a needle bearing 118 at an opening on the axis of the inner gear element 110. The crankshaft 116 is journalled in a needle bearing 119 in a housing 120.

The inner gear element 110 is formed with five cycloid holes 124 which are centered on and equally spaced along a circle centered on the axis of the inner gear element 110. A plate 126 has five cycloid pins 120 which mate with the cycloid holes of the inner gear element 110 of the first stage. The plate 126 is mounted on a needle bearing 131 on the main shaft of the crankshaft.

The periphery 132 of the plate 126 is a cylinder which has the same eccentricity with respect to the crankshaft 116 as does the eccentric 115. The cylindrical periphery 132 is journalled as a friction bearing in a central opening of the inner gear element 210 of the second stage. The inner gear element 210 of the second stage has five cylindrical cycloid holes 224 which mate with five cycloid pins 230 of a plate 226 which is integral with a driveshaft 228 that is journalled in a needle bearing 231 in the housing 120 coaxially with the crankshaft 116. The outer gear element 112 of the first stage and the outer gear element 212 of the second stage are fastened to the housing by four bolts 122.

In each of the internal gear sets of FIGS. 4 and 5, the ratio of the root diameter of the inner gear element (110 and 210, respectively) to the eccentricity is 24 to 1. As is apparent from the drawing, both inner gear elements have sufficient metal for good strength in spite of the cycloid holes (124 and 224, respectively).

Since the inner gear elements 110 and 210 each have ten teeth, the driveshaft 228 makes one rotation per 100 rotations of the crankshaft 116.

As can be seen in FIGS. 4 and 5, the teeth 111, 113, 211 and 213 of the four gear elements can be of very rudimentary construction. Only the tip arcs need be rounded. While each inner gear element 110, 210 must be able to rotate in an epicycloid fashion within its outer gear elements 112, 212, considerable play can be tolerated, and the speed changer will continue to perform satisfactorily after considerable wear on the teeth.

Figure 6:
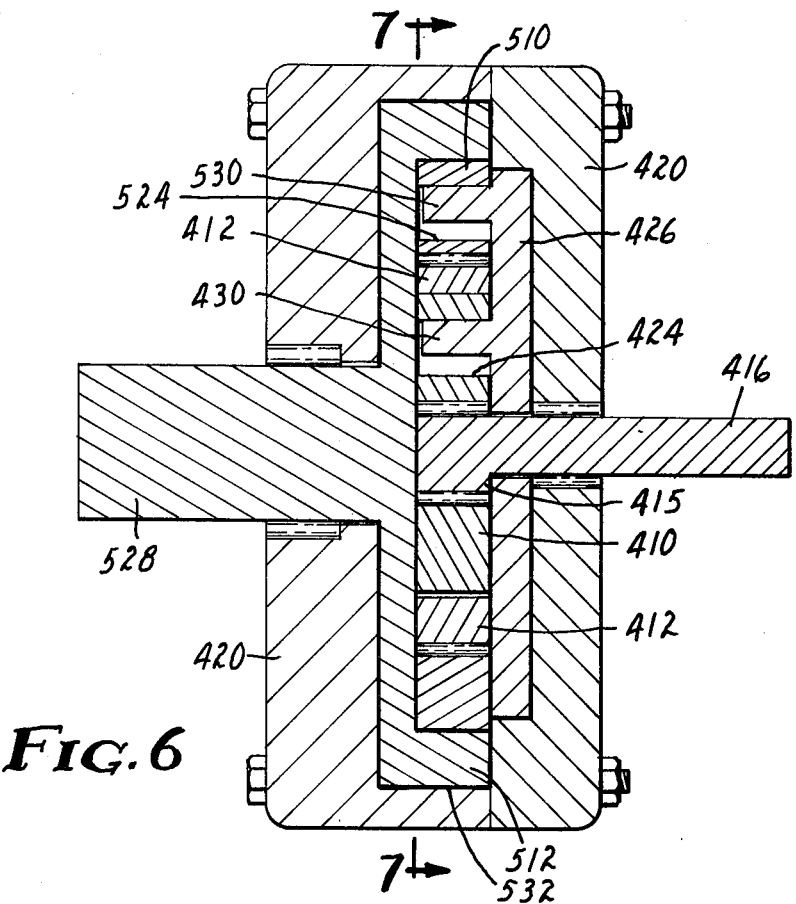
FIG. 6 is a central section of a radially-stacked two-stage speed changer of the invention.
Figure 7:
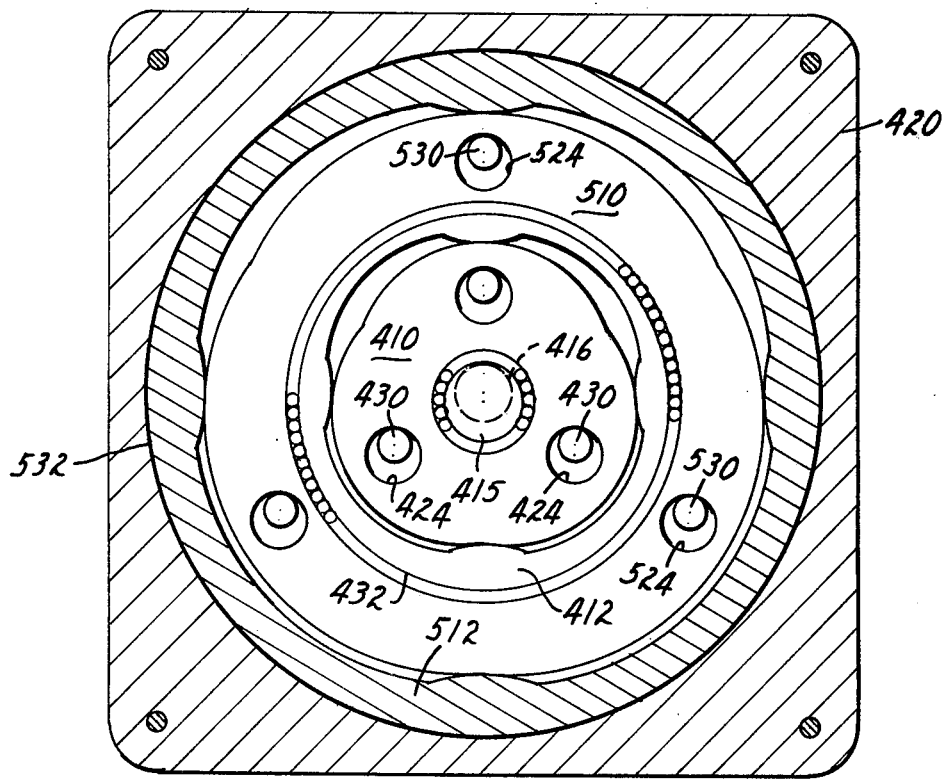
FIG. 7 is a section along line 7—7 of FIG. 6.

In contrast to the longitudinally-stacked stages shown in FIGS. 3–5, a multi-stage speed changer of the invention can employ radially-stacked stages as illustrated in FIGS. 6 and 7. Basically each of the two stages of the speed changer of FIGS. 6 and 7 has the same construction as in FIGS. 1 and 2 except that the two stages share one plate. The inner gear element 410 of the first or inner stage is journalled on an eccentric 415 of a crankshaft 416. The ratio of the root diameter of the inner gear element 410 to the eccentricity is 15 to 1. Three cycloid pins 430 extend from a plate 426, which is fixed to the housing 420, into cycloid openings 424 in the inner gear element 410 to allow it to translate in a circular path without rotating. The outer gear element 412 of the first stage has a cylindrical periphery 432 which has the same eccentricity with respect to the crankshaft 416 as does the eccentric 415. The cylindrical periphery 432 is journalled in an opening on the axis of the inner gear element 510 of the second stage. The inner gear element 510 has three cycloid openings 524 mating with cycloid pins 530 of the plate 426 to allow the inner gear element 510 to translate in a circular path. The ratio of the root diameter of the inner gear element 510 to the eccentricity is 30 to 1. The cylindrical periphery 532 of the outer gear element 512 of the second stage is concentric with the crankshaft 416.

When the crankshaft 416 is rotated one revolution, the orbiting inner gear element 410 of the first stage produces ¼ rotation of the outer gear element 412. This in turn translates the inner gear element 510 of the second stage to produce 1/16 rotation of the outer gear element 512 and the driveshaft 528 which is integral therewith.

By attaching the driveshaft 528 to the wheel of a railroad boxcar with the housing 420 anchored to the frame, a small rotational force applied to the crankshaft 416 would be sufficient to move the boxcar slowly, even up a slight grade.

More complex speed changers may be designed for special purposes. For example, the second stage of a 3-stage speed changer of the invention may be radially stacked on the first, and the third stage driven from the second may be longitudinal to the first two stages.

I claim:

1. An efficient, economical rotary speed changer comprising a housing containing
   (a) a 2-element internal gear set, the inner element having n external teeth and the outer element having n+1 internal teeth, all of which are in substantial contact with the facing external teeth,
   (b) a crankshaft journalled in the housing coaxially with said outer element and having an eccentric journalled in an opening on the axis of the inner element,
   (c) the inner element having m cylindrical cycloid holes or pins centered on and equally spaced along a circle centered on its axis, n and m each being integers, n being at least three,
   (d) a plate having a cylindrical cycloid pin or hole mating with each hole or pin of the inner element, the diameter of each cycloid hole exceeding the diameter of the mating pin plus twice the eccentricity of the crankshaft-eccentric,
   (e) the ratio of the root diameter of the inner element to the eccentricity being at least 9 to 1, and
   (f) one of said plate and outer element being fixed to the housing and the other free to rotate at a reduced speed relative to that at which the crankshaft rotates.

2. A speed changer as defined in claim 1 wherein said outer element is fixed to the housing, m is at least three and a driveshaft is fixed to said plate and is journalled in the housing coaxially with said crankshaft so that there is one revolution of the driveshaft for each n revolutions of the crankshaft.

3. A speed changer as defined in claim 1 wherein said plate is fixed to the housing to allow the inner gear element to translate in a circular path without rotating and there are n+1 revolutions of the crankshaft for each revolution of the outer gear element.

4. A speed changer as defined in claim 1 wherein said outer element is fixed to the housing and m is at least three and further including
   (g) a second 2-element internal gear set, its inner element having x external teeth and its outer element having x+1 internal teeth, all of which are in continuous substantial contact with the facing external teeth,
   (h) said plate having a cylindrical periphery which is eccentric to said crankshaft and is journalled in an opening in and on the axis of the inner element of the second gear set,
   (i) the inner element of the second gear set having y cylindrical cycloid pins or holes centered on and equally spaced along a second circle centered on its axis, x and y each being integers, x being at least three,
   (j) a second plate having a cylindrical cycloid hole or pin mating with each pin or hole of the inner element of the second gear set,
   (k) the ratio of the root diameter of the inner element of the second gear set to the eccentricity being at least 9 to 1, and
   (l) one of said second plate and outer element of the second gear set being fixed to the housing and the other free to rotate at a reduced speed relative to the speed of rotation of the crankshaft.

5. A speed changer as defined in claim 4 wherein the outer element of the second gear set is fixed to the housing, y is at least three, and a driveshaft is fixed to said second plate coaxially with said crankshaft so that there are n times x revolutions of the crankshaft for each revolution of the driveshaft.

6. A speed changer as defined in claim 4 wherein said second plate is fixed to the housing to allow the inner gear element of the second gear set to translate in a circular path without rotating and there are n times (x+1) revolutions of the crankshaft for each revolution of the outer element of the second gear set.

7. A speed changer as defined in claim 6 and further including a third internal gear set and the second plate or outer element of the second gear set which is free to rotate has a cylindrical periphery which is eccentric to the crankshaft and is journalled in an opening in and on the axis of the inner element of the third gear set, the ratio of the root diameter of the inner element of the third gear set to the eccentricity being at least 9 to 1.

8. A speed changer as defined in claim 3 and further including
   (g) a second 2-element internal gear set, its inner element having x external teeth and its outer element having x+1 internal teeth, all of which are in continuous substantial contact with the facing external teeth,
   (h) the outer element of the first gear set having a cylindrical periphery which is eccentric to said crankshaft and is journalled in an opening in and on the axis of the inner element of the second gear set,
   (i) the inner element of the second gear set having y cylindrical cycloid pins or holes centered on and equally spaced along a second circle centered on its axis, x and y being integers, x being at least three, (j) said plate or a second plate having a cylindrical cycloid hole or pin mating with each pin or hole of the inner element of the second gear set, (k) the ratio of the root diameter of the inner element of the second gear set to the eccentricity being at least 9 to 1, and (l) one of said second plate and outer element of the second gear set being fixed to the housing and the other free to rotate at a reduced speed relative to the speed of rotation of the crankshaft.

9. A speed changer as defined in claim 1 and including a second internal gear set and plate of the same construction as the first, the one of the first plate and outer element of the first gear set which is free to rotate has a cylindrical periphery which is eccentric to the crankshaft and is journalled in an opening in and on the axis of the inner element of the second gear set, one of the second plate and outer element of the second gear set being fixed to the housing and the other being free to rotate at a reduced speed relative to that of the crankshaft.

10. A speed changer as defined in claim 1 wherein the ratio of the root diameter of the inner element to the eccentricity is at least 12 to 1.

11. A speed changer as defined in claim 1 wherein the inner element is formed with cycloid holes and the cycloid pins are affixed to the plate.

* * * * *